US011435393B2

(12) United States Patent
Fonseca et al.

(10) Patent No.: US 11,435,393 B2
(45) Date of Patent: Sep. 6, 2022

(54) ENHANCEMENT OF YIELD OF FUNCTIONAL MICROELECTRONIC DEVICES (71) Applicant: Tokyo Electron Limited, Tokyo (JP)

(72) Inventors: Carlos A. Fonseca, Austin, TX (US); Nathan Ip, Austin, TX (US); Joel Estrella, Austin, TX (US)

(73) Assignee: TOKYO ELECTRON LIMITED, Tokyo (JP)

( * ) Notice: Subject to any disclaimer, the term of this patent is extended or adjusted under 35 U.S.C. 154(b) by 921 days.

(21) Appl. No.: 16/179,526

(22) Filed: Nov. 2, 2018

(65) Prior Publication Data

US 2019/0137565 A1 May 9, 2019

Related U.S. Application Data (60) Provisional application No. 62/753,153, filed on Oct. 31, 2018, provisional application No. 62/753,155, filed on Oct. 31, 2018, provisional application No. 62/581,535, filed on Nov. 3, 2017.

(51) Int. Cl.
*G01R 31/28* (2006.01)
*G01R 1/02* (2006.01)
*G06F 30/30* (2020.01)
*H01L 21/67* (2006.01)
(Continued)

(52) U.S. Cl.
CPC ......... *G01R 31/2831* (2013.01); *G01R 1/025* (2013.01); *G06F 30/30* (2020.01); *H01L 21/67276* (2013.01); *H01L 22/20* (2013.01); *G06F 2119/18* (2020.01); *H01L 22/12* (2013.01)

(58) Field of Classification Search
CPC ..... G01R 31/2831; G01R 1/025; G06F 30/30; G06F 2119/18; H01L 21/67276; H01L 22/20; H01L 22/12
See application file for complete search history.

(56) References Cited

U.S. PATENT DOCUMENTS 6,408,219 B2 6/2002 Lamey, Jr. et al.
6,594,002 B2 7/2003 Drohan et al.
6,795,952 B1 9/2004 Stine et al.
(Continued)

FOREIGN PATENT DOCUMENTS

EP 1254401 B1 5/2004
KR 20170011554 A 2/2017
(Continued)

OTHER PUBLICATIONS

EP Extended European Search Report, European Application No. 18872757, dated Jul. 9, 2021, 10 pages.

*Primary Examiner* — Fernando L Toledo
*Assistant Examiner* — Neil R Prasad
(74) *Attorney, Agent, or Firm* — Slater Matsil, LLP (57) ABSTRACT Described herein are techniques related to a semiconductor fabrication process that facilitates the enhancement of systemic conformities of patterns of the fabricated semiconductor wafer. A semiconductor wafer with maximized systemic conformities of patterns will maximize the electrical properties and/or functionality of the electronic devices formed as part of the fabricated semiconductor wafer. This Abstract is submitted with the understanding that it will not be used to interpret or limit the scope or meaning of the claims.

18 Claims, 4 Drawing Sheets (51) Int. Cl.
*H01L 21/66* (2006.01)
*G06F 119/18* (2020.01)

(56) References Cited

U.S. PATENT DOCUMENTS

| | | |
|---|---|---|
| 6,912,437 B2 | 6/2005 | Chong et al. |
| 6,954,883 B1 | 10/2005 | Coss, Jr. et al. |
| 7,386,418 B2 | 6/2008 | Lin et al. |
| 7,482,178 B2 | 1/2009 | Mui et al. |
| 8,357,286 B1 | 1/2013 | Molnar |
| 9,747,520 B2 | 8/2017 | Wen |
| 10,079,183 B2 | 9/2018 | Gao et al. |
| 10,181,185 B2 | 1/2019 | Park et al. |
| 10,223,494 B2 | 3/2019 | Shin et al. |
| 10,234,401 B2 | 3/2019 | Buhl et al. |
| 10,310,490 B2 | 6/2019 | Buhl et al. |
| 10,354,873 B2 | 7/2019 | Ko et al. |
| 10,727,142 B2 | 7/2020 | Gellineau et al. |
| 2001/0051836 A1 | 12/2001 | Lamey, Jr. et al. |
| 2002/0017911 A1 | 2/2002 | Drohan et al. |
| 2004/0093110 A1 | 5/2004 | Chong et al. |
| 2004/0267490 A1 | 12/2004 | Opsal et al. |
| 2005/0032250 A1 | 2/2005 | Mui et al. |
| 2006/0128039 A1 | 6/2006 | Lin et al. |
| 2008/0248412 A1 | 10/2008 | Stuber et al. |
| 2011/0170091 A1* | 7/2011 | Chang .................. G03F 7/7065 356/237.5 |
| 2014/0114597 A1 | 4/2014 | Chen et al. |
| 2014/0204194 A1 | 7/2014 | Otani et al. |
| 2015/0006097 A1 | 1/2015 | Gao et al. |
| 2016/0275671 A1 | 9/2016 | Li et al. |
| 2016/0372303 A1* | 12/2016 | Park ...................... G06K 9/6267 |
| 2017/0024510 A1 | 1/2017 | Shin et al. |
| 2017/0097574 A1* | 4/2017 | Goodwin ............ G03F 7/70775 |
| 2017/0200264 A1 | 7/2017 | Park et al. |
| 2017/0221741 A1 | 8/2017 | Buhl et al. |
| 2017/0242425 A1 | 8/2017 | Buhl et al. |
| 2017/0358450 A1 | 12/2017 | Ko et al. |
| 2018/0300434 A1* | 10/2018 | Hu ...................... G03F 7/70441 |
| 2018/0350699 A1 | 12/2018 | Gellineau et al. |
| 2019/0139798 A1 | 5/2019 | Fonseca et al. |
| 2020/0135592 A1 | 4/2020 | Fonseca et al. |
| 2020/0233315 A1 | 7/2020 | Nije et al. |

FOREIGN PATENT DOCUMENTS

| | | |
|---|---|---|
| KR | 20170091536 A | 8/2017 |
| WO | 2014024178 A1 | 2/2014 |

* cited by examiner

ENHANCEMENT OF YIELD OF FUNCTIONAL MICROELECTRONIC DEVICES

RELATED APPLICATIONS

The present application claims the benefit of U.S. Provisional Patent Application No. 62/581,535, filed on Nov. 3, 2017, entitled "Enhancement of Yield of Functional Microelectronic Devices," which is incorporated herein by reference in its entirety. Also, the present application claims the benefit of U.S. Provisional Patent Application No. 62/753, 153, filed on Oct. 31, 2018, entitled "Active Process Modeling," which is incorporated herein by reference in its entirety. Furthermore, the present application claims the benefit of U.S. Provisional Patent Application No. 62/753, 155, filed on Oct. 31, 2018, entitled "Transfer Function and Process Modeling for The Fabrication Of Microelectronic Devices," which is incorporated herein by reference in its entirety.

BACKGROUND

A microelectronic device is an individual electronic device and component or a collection thereof at a micrometer or smaller scale. An individual microelectronic device may include transistors, capacitors, inductors, resistors, diodes, insulators, conductors, and the like. Other devices may include circuitry and some combination of individual devices. An integrated circuit (IC) is such an example of such a device, which is sometimes called a microchip or the like.

Because of their small size, sophisticated techniques are used in the manufacture of microelectronic devices. One such technique involves the fabrication of semiconductor wafers. Typically, the microelectronic devices are produced as part of a stack of patterned layers of materials to form a semiconductor wafer.

As the size of microelectronic devices decreases and their complexity increases, it becomes increasingly more difficult to maximize the yield of electrical-mechanically functional microelectronic devices produced by semiconductor fabrication. The existing approaches to address these issues are becoming less effective.

SUMMARY

In cooperation with a semiconductor fabrication process, the technologies described herein facilitate the enhancement of systemic conformities of patterns of a semiconductor wafer. A semiconductor wafer with few or no systemic non-conformities will maximize the electrical-mechanical properties and/or functionality of the electronic devices formed as part of the fabricated semiconductor wafer.

In cooperation with the fabrication process, the technologies described herein use fabrication metrology data of the semiconductor wafers to determine a systemic impact on non-conformities in non-conforming regions on the electrical-mechanical functionality of the microelectronic devices being formed therein. With this determination, an amelioration may be performed on the non-conformities that are determined to have a sufficient systemic impact on the electrical-mechanical functionality of the microelectronic device being formed as part of the semiconductor wafer. That amelioration may be performed by one semiconductor fabrication tool or a combination of multiple tools.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

In cooperation with a semiconductor fabrication process, the technologies described herein facilitate the enhancement of systemic conformities of patterns of a semiconductor wafer. A semiconductor wafer with limited systemic non-conformities will maximize the electrical-mechanical properties and/or functionality of the electronic devices formed as part of the fabricated semiconductor wafer.

The fabrication of semiconductor wafers may be described as a formation of a collection of microelectronic devices from an accumulation of layers of pattern semiconductor material of a semiconductor wafer. The layers may also be described as a stack of patterns of materials. The formed microelectronic devices are designed to be electrically and mechanically functional when operated in their intended manner.

In cooperation with the fabrication process, the technologies described herein operate to detect and ameliorate systemic non-conformities of the fabricated wafer. As described herein, an example of that includes gathering fabrication metrology data of the semiconductor wafers. That is, the fabrication metrology data includes measurements from or about the wafer as it is being fabricated. Based on that gathered fabrication metrology data, non-conformities of the semiconductor wafer are detected. A visualization of a layer (or multiple layers) of the gathered fabrication metrology data of the semiconductor wafer is generated and displayed. At least one non-conforming region is identified. The non-conforming region is an aggregation of neighboring non-conformities.

Then, with the technologies described herein, a determination is made of a systemic impact on the non-conformities in the non-conforming regions on the electrical-mechanical functionality of the microelectronic devices being formed. With this determination, an amelioration is performed on the non-conformities in the non-conforming regions that are determined to have a sufficient systemic impact on the electrical-mechanical functionality of the microelectronic device being formed as part of the semiconductor wafer. That amelioration may be performed by one semiconductor fabrication tool or a combination of multiple tools.

Example Semiconductor Fabrication

Figure 1:
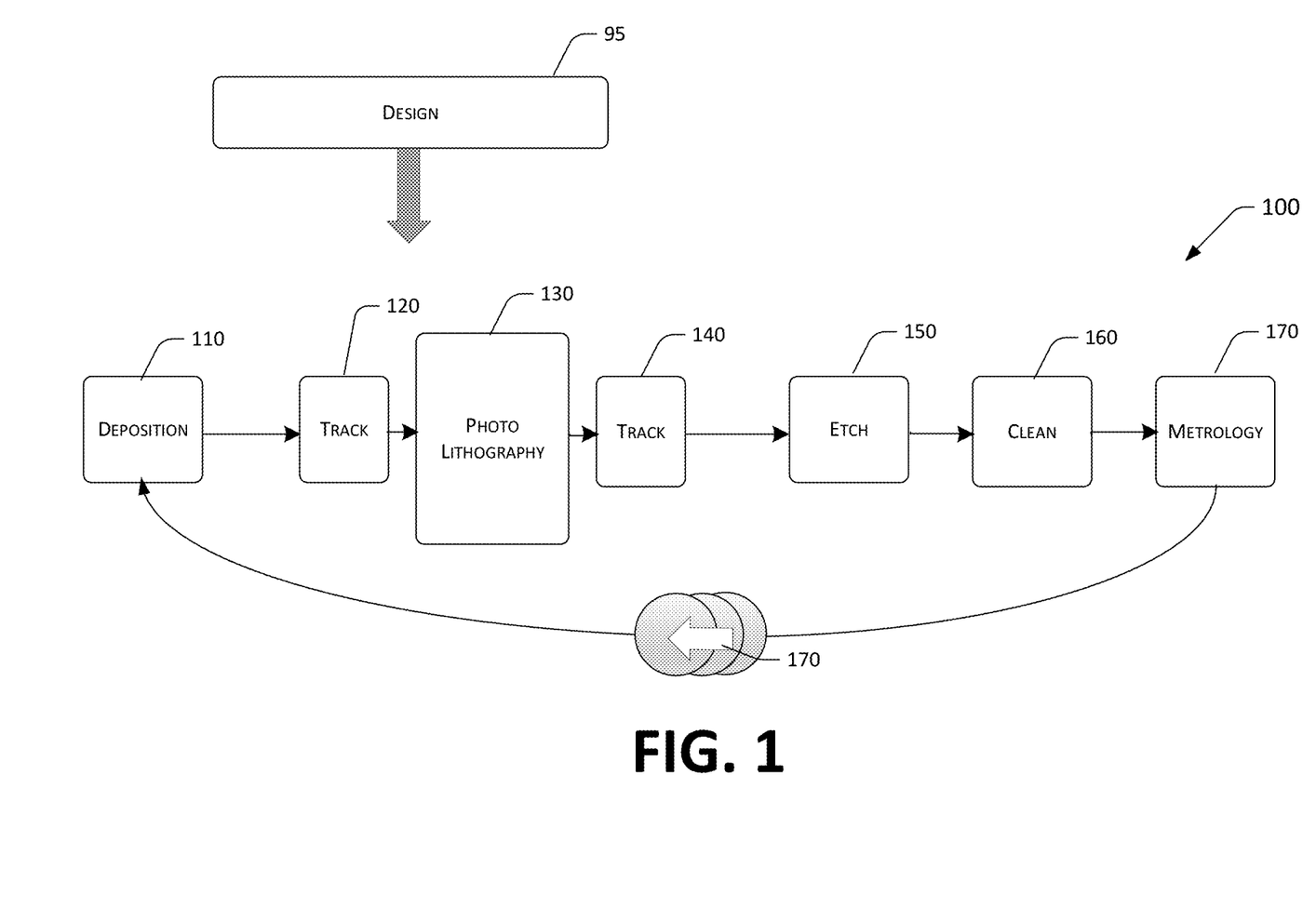
FIG. 1 is a block diagram illustrating an example of a typical semiconductor fabrication process.

FIG. 1 shows an example of a typical semiconductor fabrication 100. Before the fabrication itself, the overall design 95 of the semiconductor wafer and the microelectronic devices formed therein are produced. A layout is produced from the design. The layout includes sets of patterns that will be transferred to the stacked layers of material that forms the semiconductor wafer during its fabrication. Since the design 95 affects and informs various portions of the fabrication, it is depicted with a broad arrow generally pointing to the fabrication rather than to particular parts thereof.

The example fabrication 100 includes deposition 110, photolithography 130, etch 150, cleaner 160, and fabrication metrology data 170. The photolithography 130 is bracketed by tracks 120 and 140.

As depicted, the example fabrication 100 represents the fabrication of a single layer of a semiconductor wafer. Arrow 170 indicates that the wafer fabrication involves the multiple stacking layers of patterns. While the fabrication of a single layer is described in a particular order herein, it not uncommon for some portions to be skipped and others repeated during the fabrication of a single layer.

The deposition 110 employs a deposition tool that grows, coats, or otherwise transfers a material onto the wafer. A deposition tool may employ one or more technologies to accomplish this task. Examples of deposition technologies include physical vapor deposition (PVD), chemical vapor deposition (CVD), electrochemical deposition (ECD), molecular beam epitaxy (MBE) atomic layer deposition (ALD), and others.

The photolithography 130 employs a photolithographic tool that is used to transfer a pattern from a photomask to the surface of the wafer (i.e., substrate). The pattern information is recorded on a layer of photoresist which is applied on the substrate. The photoresist changes its physical properties when exposed to light (often ultraviolet) or another source of illumination (e.g., X-ray). The photoresist is either developed by (wet or dry) etching or by conversion to volatile compounds through the exposure itself. The pattern defined by the mask is either removed or remained after development, depending if the type of resist is positive or negative. For example, the developed photoresist can act as an etching mask for the underlying layers.

Typically, the track 120 has a track tool that prepares the wafer/substrate for the photolithography. This may involve cleaning of the wafer/substrate or add a coating or film thereon. Similarly, the track 140 has a tool that handles the wafer/substrate after the photolithography 130. Often, this involves post-lithographic cleaning or preparation for the next step in the fabrication.

The etch 150 includes an etching tool that is used to remove and/or add material selectively on the surface of the wafer (i.e., substrate) in order to create patterns thereon. Typically, the material is selectively removed either by wet (i.e., chemical) or dry (i.e., physical) etching. An example of dry etching is plasma etching.

Plasma etching involves a high-speed stream of glow discharge (plasma) of an appropriate gas mixture being shot at a sample. The plasma source, known as etch species, can be either charged (ions) or neutral (atoms and radicals). During the process, the plasma generates volatile etch products at room temperature from the chemical reactions between the elements of the material etched and the reactive species generated by the plasma. Eventually, the atoms of the shot element embed themselves at or just below the surface of the target, thus modifying the physical properties of the target The cleaner 160 includes a cleaning tool that is used to clean the wafer/substrate (e.g., remove photoresist) and/or prepare the wafer/substrate for the application of the next layer. Typically, the cleaning tool removes particles and impurities on the wafer.

The fabrication metrology data 170 includes at least one fabrication metrology data tool (e.g., sensor) that is designed to measure some aspect of the wafer fabrication process itself, the operation of a fabrication tool, or something measurable about the wafer, the substrate, the patterns imparted thereon, and the like. While this is shown in FIG. 1, this tool may be employed anywhere in the process and at multiple stages with each tool.

Example System for Enhancement of Yield of Functional Microelectronic Devices

Figure 2:
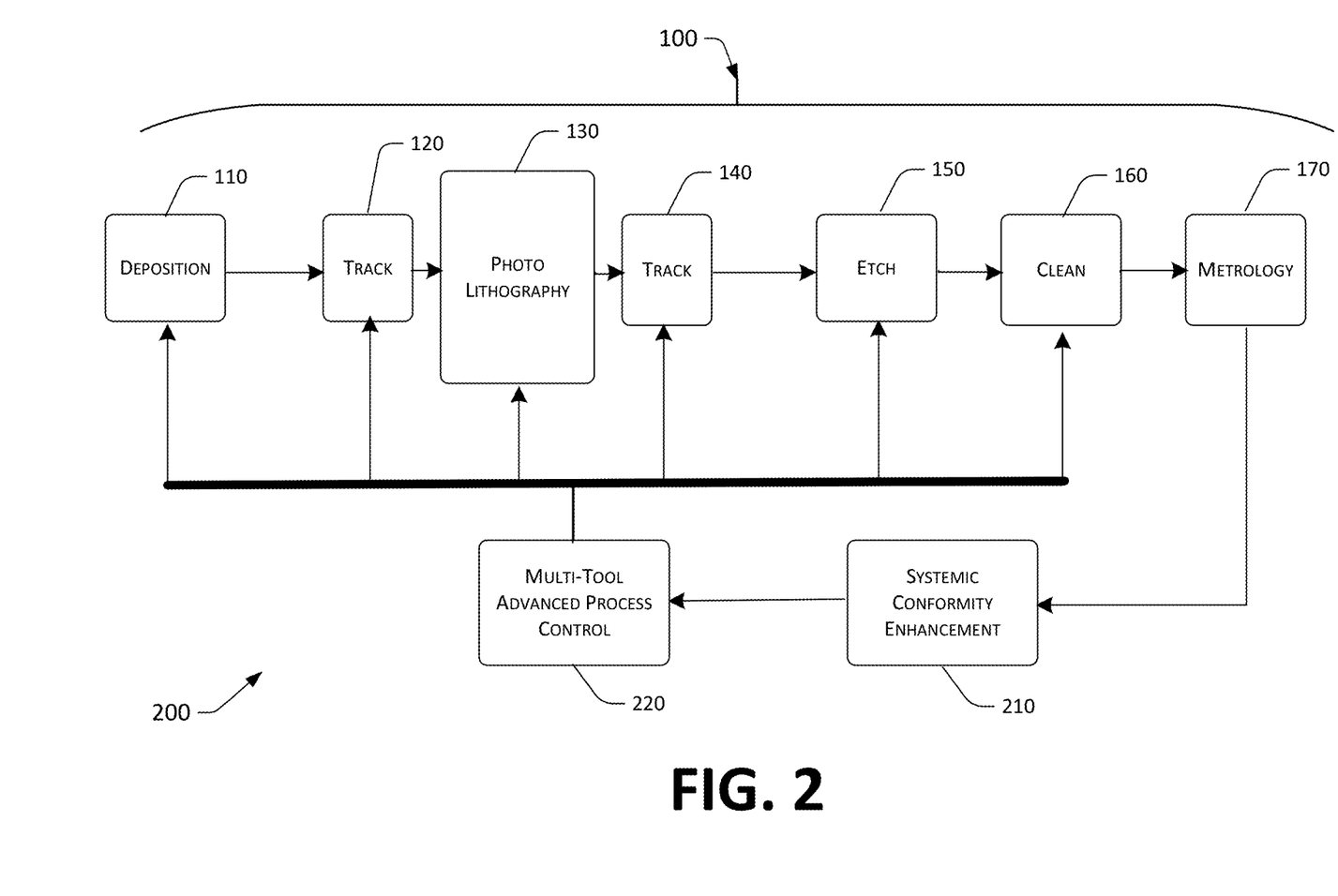
FIG. 2 is a block diagram illustrating an example system in accordance with the present disclosure.

FIG. 2 illustrates an example system 200 that enhances the yield of functional microelectronic devices produced from semiconductor fabrication in accordance with the technologies described herein. Stated differently, this figure illustrates the example system 200 that facilitates the detection and amelioration of systemic non-conformities during semiconductor fabrication in accordance with the technologies described herein. The example system 200 includes the semiconductor fabrication 100 described above and shown in FIG. 1.

As depicted, the example system 200 includes the tools of the semiconductor fabrication 100, systemic conformity enhancement tool 210, and a multi-tool advanced process control (APC) tool 220. The semiconductor fabrication 100 includes tools to perform the deposition 110, the photolithography 130, the etch 150, the cleaner 160, and fabrication metrology data 170. The tool for photolithography 130 is bracketed by tools for track 120 and 140.

The technologies described herein may be incorporated into only one part/portions of the example system 200 or multiple parts/portions of the example system 200. That is, the technologies described here may, for example, be incorporated into only one tool (e.g., the etch 150). Alternatively, for example, the technologies described herein may be implemented by multiple tools and systems. For example, they may be implemented by the deposition 110, cleaner 160, and the systemic conformity enhancement tool 210. Moreover, the example system 200 may employ the technologies described herein to perform a method 300 described below.

The systemic conformity enhancement tool 210 is a system that is specifically designed to coordinate data collection and analysis with the fabrication 100 or some portion of the fabrication. Indeed, in some implementations, the systemic conformity enhancement tool 210 performs the bulk of the example process 300 described below. The tool 210 itself may be constructed from one or more computing devices operating a specially designed set of computer programs.

The multi-tool APC tool 220 is a particularly designed APC for directing the actions of multiple tools so as to ameliorate (e.g., correct) the non-conformities. In other implementations, the APC tool 220 may control only one tool. An APC tool 220 is typically implemented by one or more computing systems with specially designed programs running thereon.

An APC is a component to improve performance, yield, throughput, and flexibility of the manufacturing process using run-to-run, wafer-to-wafer, within the wafer and real-time process control. Typically, an APC system is multivariate, model-based APC system that is developed in conjunction with feed-forward and feedback mechanisms to automatically determine the optimal recipe for each wafer based on both incoming wafer and tool state properties. The typical APC system uses wafer fabrication metrology data, process models and sophisticated control algorithms to provide dynamic fine-tuning of intermediate process targets that enhance final device targets. The design of the APC system enables scalable control solutions across a single chamber, a process tool, multi-tools, a process module and multi-process modules using similar building blocks, concepts, and algorithm.

Exemplary Process

Figure 3:
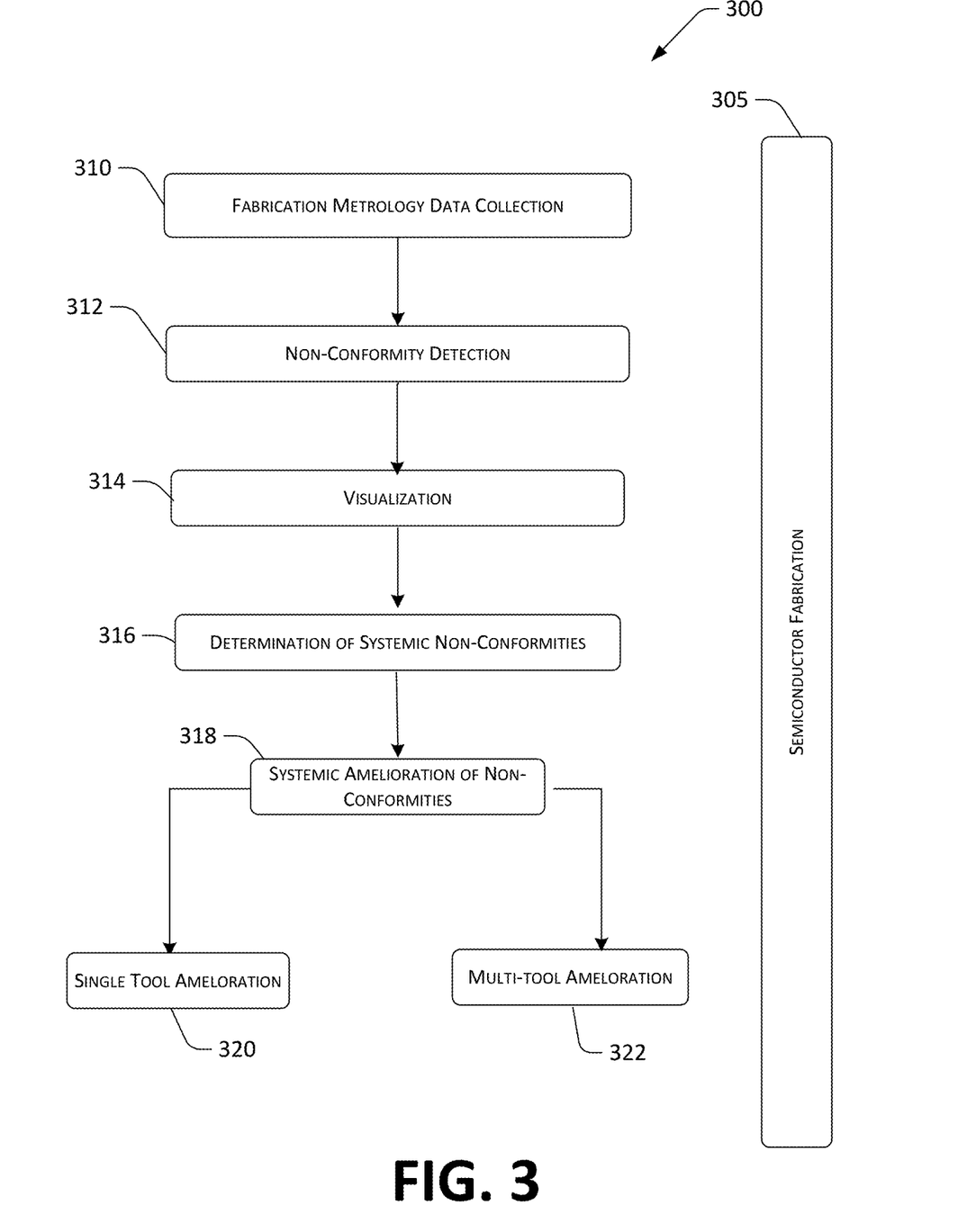
FIG. 3 is a flowchart illustrating an example method in accordance with the present disclosure.

FIG. 3 is a flow diagram illustrating an example process 300 that implements the techniques described herein. The example process 300 is performed, at least in part, by the example system 200 and it facilitates the enhancement of systemic conformities of patterns during semiconductor fabrication.

The example process 300 is performed in cooperation with a fabrication 305 of semiconductor wafers. In some instances, the cooperation may include the example process 300 being an integral part of the fabrication itself.

In cooperation with the fabrication, the example system 200 forms a collection of microelectronic devices from a stack of patterns of materials (i.e., layers) of a semiconductor wafer. The formed microelectronic devices are designed to be electrically and/or mechanically functional when operated in their intended manner.

At block 310, the example system 200 gathers fabrication metrology data of the semiconductor wafers. This fabrication data is produced from measurements taken of, about, on, in, and for the wafer that is in the process of fabrication or has just completed its fabrication. That is, the fabrication metrology data is a measurement of a characteristic of the wafer formed in the semiconductor fabrication.

The fabrication metrology data includes measurements of one or more characteristics of one or more wafers formed in the semiconductor fabrication and each measurement being associated with a spatial location of the wafer from where such measurement is made.

For example, the fabrication metrology data may be derived from measurements about an active layer, patterns in that active layer, devices completed by the active layer, an inchoate device exposed by the active layer, and the like. Herein, the active layer is the layer that is the focus of the fabrication at that moment. Often, the active layer is the top or uppermost layer. For example, the active layer is the one that is or was just deposited, cleaned, or etched.

In some instances, for example, the fabrication metrology data may be derived from measurements about layer immediately adjacent the active layer, patterns in that adjacent layer, devices completed by the adjacent layer, an inchoate device exposed by the adjacent layer, and the like. Often, that immediate adjacent layer is the layer just below the active or uppermost layer.

In still other instances, for example, the fabrication metrology data may be derived from measurements about multiple adjacent layers of the wafer or of the wafer itself. For example, the multiple adjacent layers of the wafer may include electrically and/or mechanically interacting microelectronic devices therein.

Typically, the fabrication metrology data includes measurements from (calculations based on measurements from) multiple semiconductor wafers using a common stack of patterns of materials during the semiconductor fabrication. Examples of the fabrication metrology data include measuring and/or calculating data such as measuring and/or calculating fabrication metrology data selected from a group consisting of edge placement error (EPE); grid critical dimension (CD) measurements; block line width roughness (LWR) measurements; grid LWR measurements; block CD measurements; profile; cross-section; selective deposition; electrical properties of the formed microelectronic devices; contact hole CD; contact hole roughness; CER and ellipticity; short trenches tip-to-tip distance; line tip-to-tip distance; layer-to-layer displacement data; overlay data; film thicknesses and uniformities; measurements that occur after actions of a single tool; measurements that occur after all of the tools of a single layer; measurements that occur after multiple layers; and a combination thereof.

As used herein, the edge placement error (EPE) is, for example, a measure of the amount of error between an actual device feature edge position and the intended (target) feature edge position. The grid critical dimension (CD) measurements is, for example, the distance measured from one feature edge to another feature edge as determined by scanning electron microscope (SEM) image or other metrology techniques, such as AFM (atomic force microscope), scatterometry/diffraction-based metrology, or the like. The block line width roughness (LWR) measurements is, for example, a measure of the amount of deviation along the edge of a feature relative to an average edge position. In this context, a "block" feature is a grouping of neighboring features.

At block 312, the example system 200 detects non-conformities of the semiconductor wafer based on the gathered fabrication metrology data. A non-conformity is an area of an active layer with characteristics that are capable of being measured and where such measurements fall outside a defined range and/or threshold.

What can be measured depends on a given process flow (i.e., manufacturing process flow for a device layer(s)). As an example, one can focus on a multi-patterning process flow such as Self-Aligned Quadruple Patterning (SAQP) and block patterning scheme. For this scheme, there are several geometries at the wafer level that can measured with metrology tools. Examples of which include line patterns, trench patterns, overlay and other derived metrics from a combination of the above metrics. Typical dimension for lines and trenches is in order of 10 to 30 nanometers and for overlay data about 1 nm-10's of nanometers At block 314, the example system 200 generates a visualization of the gathered fabrication metrology data of the semiconductor wafer. The visualization includes the production of an image of an active layer with particular colors and/or shading that corresponds to particular locations of the wafer are associated with measured and/or calculated range of fabrication metrology data and/or with the non-conforming region.

In some implementations, the operations of block 314 may be described as generating a model of the semiconductor wafer based on the gathered fabrication metrology data of the semiconductor wafer, and, based on the generated model, detecting non-conformities of the semiconductor wafer based on the gathered fabrication metrology data.

Figure 4A:
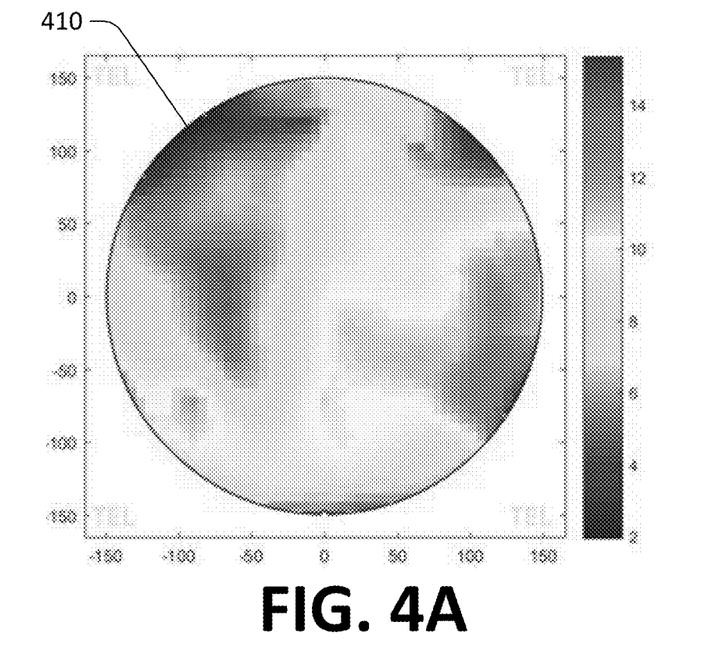
FIGS. 4A and 4B illustrate visualizations of a surface of a wafer with regions of non-conformities. The visualizations represent those produced in accordance with the present disclosure.

FIG. 4A shows a multicolored circular image 410, which is a representative visualization of the gathered fabrication metrology data of an active layer of the wafer (e.g., the top layer). In the example image 410, each spot in the circular image corresponds with a physical location of the active layer and the color and/or shading of that spot is indicative of the relative value of the gathered fabrication metrology data associated with the corresponding physical location.

At block 316, the example system 200 determines whether there are regions of non-conformities of the active layer of the wafer. An area of the active layer is designated as a non-conforming region when it has an aggregation of neighboring non-conformities. The identification of the non-conforming region includes partitioning a region of a layer of the wafer that includes an aggregation of neighboring non-conformities.

Figure 4B:
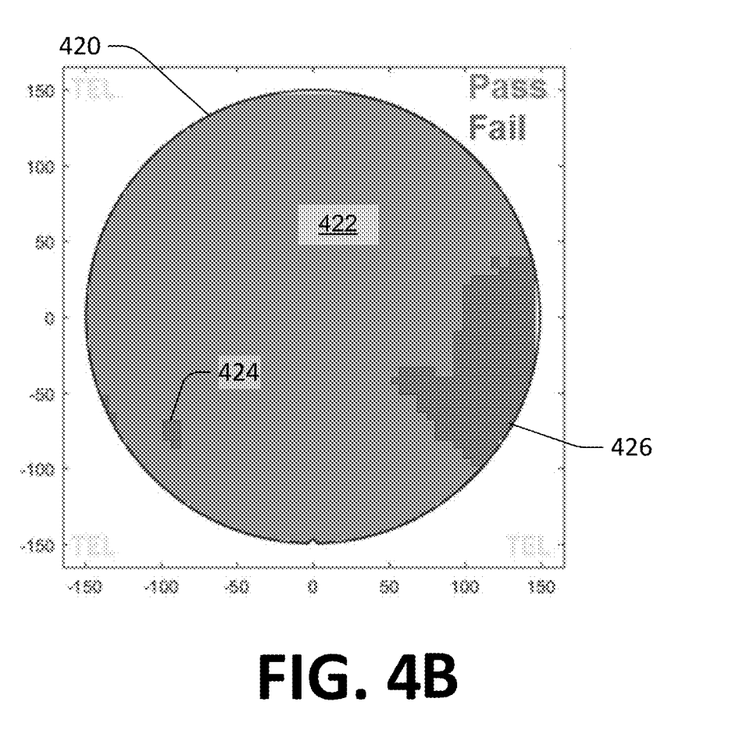

FIG. 4B shows a dual-colored circular image 420, which is a representative visualization of the gathered fabrication metrology data of an active layer of the wafer (e.g., the top layer). Indeed, the circular image 420 is derived from the multicolored circular image 410. Rather, the circular image 420 is derived from the same dataset from which the multicolored circular image 410 is derived. However, only two colors or shades are employed in this visualization.

Using at test based on a threshold or range and a measure of adjacentness, areas of the active layer are identified as passing or failing. Alternatively, the areas of passing are called conforming regions, and the areas of failing are called non-conforming regions. In circular image 420, region 422 is a conforming region, but regions 424 and 426 are non-conforming regions.

At block 318, the example system 200 determines the systemic impact on the non-conformities in the non-conforming regions on the functionality of the microelectronic devices being formed. With the example process 300, this includes an estimate of the electrical-mechanical properties and/or functionality of an actual pattern of the active layer that includes the non-conforming region of the semiconductor wafer. In some approaches, this determination includes a modeling of the electrical-mechanical properties and/or functionality of the microelectronic devices formed by at least the active layer with the non-conforming region of the semiconductor wafer.

The determination of the systemic impact may include estimating the electrical-mechanical properties and/or functionality of an actual pattern of one layer with the non-conforming region of the semiconductor wafer or of the microelectronic devices formed by at least one layer with the non-conforming region of the semiconductor wafer.

At blocks 320 and 322, the example system 200 ameliorates the non-conformities in the non-conforming regions that are determined to have a sufficient systemic impact on the electrical-mechanical functionality of the microelectronic device being formed as part of the semiconductor wafer.

As used herein, the systemic impact involves a cumulative deleterious effect of non-conformities in the non-conforming regions on the functionality of the microelectronic devices being formed.

In some implementations, the sufficient systemic impact that may trigger amelioration is derived from a desired yield or a desired improvement in the yield of the functionality of the microelectronic devices being formed.

In some implementations, the sufficient systemic impact that may trigger amelioration is derived from a defined threshold of "defects," which are microelectronic devices which fail quality standards. For example, the defects include non-functioning or malfunctioning microelectronic devices that are formed with the wafer. The defect threshold may be an absolute number (e.g., 1000) or a percentage or ratio (e.g., 0.01% or 1 part per million).

In some implementations, the sufficient systemic impact that may trigger amelioration may be based on just the defects in located within given non-conforming regions, collections of such regions, a portion of the wafer (e.g., 30% of the wafer), or the entirety of the wafer.

In some implementations, the sufficient systemic impact that may trigger amelioration is based on the obtained fabrication metrology data (e.g., particles, CD, overlay, thickness, and/or uniformity) that correlate to desired yield or result.

A result (other than yield) may trigger the action to change something about the fabrication processes to achieve that goal. For example, there may be goal of a particular uniformity or flatness of the wafer that can be corrected for via one or more adjustments to the fabrication processes.

In some implementations, the sufficient systemic impact that may trigger amelioration is based identified spatial patterns of non-conformities and/or identified patterns related to particular fabrication tools.

In some implementations, the sufficient systemic impact that may trigger amelioration is based the non-co.

In some implementations, the EPE may be ameliorated by changes to particular steps in the fabrication process. For example, an EPE can be ameliorated by making a change in, for example, the lithography exposure, etch, film deposition, bake temperatures during spin-coat process, ion implant process, cleans process (wet or dry), or other process step during the device fabrication.

For example, the EPE may be adjusted or altered by making changes to the steady temperature, temperature ramp of an electrostatic chuck (e.g., entire chuck or zones), gas flow, or power during the etching process.

In some implementations, the EPE may be ameliorated by making changes to multiple process steps. For example, an EPE can be ameliorated by making changes to the bake temperature during spin-coat process in addition to focus ring temperature and voltage during the etch process step. There may be multiple changes to one process or multiple changes to multiple processes.

With block 320, that amelioration includes a selection of one or more change in operation in the semiconductor fabrication performed by at least one semiconductor fabrication tool. That is, some meaningful part of the fabrication process is changed with the goal of correcting the non-conformities itself or perhaps the underlying cause of such non-conformities. These selected changes may be performed by one semiconductor fabrication tool or a combination of multiple tools.

After that, the amelioration involves a simulation of a semiconductor wafer that would be fabricated in accordance with the selected changes in the operation. In this way, the example system 200 may be able to determine whether the selected changes are useful for the immediate goal of reducing the non-conformities (without creating new non-conformities).

After the simulation, the amelioration estimates the effect of the electrical properties and/or functionality of the microelectronic devices formed by the simulated semiconductor wafer. While the short-term goal is to reduce non-conformities, the end goal is to maximize functioning microelectronic devices in the fabricated wafer. To that end, the estimation determines if the simulated changes achieve that end goal. Thus, the amelioration may be repeated many times until the best operational changes are discovered.

The example system 200 may employ machine learning approaches as part of the amelioration. With this approach, the example system 200 learns which operational changes or combination of changes (or combination of tools) are most likely to produce effective results (of maximizing functional microelectronic devices) based on given conditions. The given conditions include the particular type of non-conformities (or combinations of types), the locations of non-conforming regions, size of such regions, etc.

If the best operational changes involve just one tool, then the example process 300 proceeds to block 320 to perform single tool amelioration. If the best operational changes involve multiple tools, then the example process 300 proceeds to block 322 to perform multiple tool amelioration.

In some implementations, the amelioration may include a selection of a pattern of a layer that includes some portion of a microelectronic device formed, at least in part, by the non-conforming region. Then, that selected pattern is altered. This alteration may be performed autonomously or semi-autonomously (that is, with some manual intervention). The goal of this approach is to eliminate the non-conformities by employing a different design.

With this approach, a simulation of the fabrication of a semiconductor wafer is run with the altered pattern replacing the selected pattern. The effect on the electrical-mechanical properties and/or functionality of the microelectronic devices formed by the simulated semiconductor wafer is estimated. That estimate helps determine if the altered pattern changes the non-conforming regions in a manner that is desirable.

A tool is one of the major components of the semiconductor fabrication process that act on the wafer itself. Examples of such tools are part of the example system 200 of FIG. 2. Those examples include a deposition tool, a track tool, a photolithography tool, an etch tool, and a cleaning tool.

Additional and Alternative Implementation Notes

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone, with hardware, and/or with hardware in combination with firmware or software. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "computer-readable media" is non-transitory computer-storage media or non-transitory computer-readable storage media. For example, computer-storage media or computer-readable storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

The following are examples of implementations of the technology described herein:

Example 1

A method that facilitates yield of functional microelectronic devices in coordination with semiconductor fabrication, wherein semiconductor fabrication includes forming a collection of microelectronic devices from layers (e.g., a stack of patterns of materials) of a semiconductor wafer, the method comprising:
  gathering fabrication metrology data of the semiconductor wafer, wherein the fabrication metrology data includes measurements of one or more characteristics of the wafer formed in the semiconductor fabrication and each measurement being associated with a spatial location of the wafer from where such measurement is made;
  detecting non-conformities of the semiconductor wafer based on the gathered fabrication metrology data;
  identifying a non-conforming region of the semiconductor wafer, wherein the non-conforming region includes an aggregation of neighboring non-conformities;
  determining the systemic impact on the non-conformities in the non-conforming regions on the functionality of the microelectronic devices formed at least in part by the non-conforming region.

Example 2

A method of Example 1, wherein the gathering of fabrication metrology data includes:
  measurements from multiple semiconductor wafers using a common stack of patterns of materials as the layers of the semiconductors being fabricated;
  measuring and/or calculating fabrication metrology data selected from a group consisting of edge placement error (EPE), grid critical dimension (CD) measurements, block line width roughness (LWR) measurements, grid LWR measurements, block CD measurements, profile (i.e., cross-section), selective deposition; electrical properties of the formed microelectronic devices; contact hole CD; contact hole roughness (CER and ellipticity; short trenches tip-to-tip distance; line tip-to-tip distance; layer-to-layer displacement data (i.e., overlay data); film thicknesses and uniformities; measurements that occur after actions of a single tool; measurements that occur after all of the tools of a single layer; measurements that occur after multiple layers; and a combination thereof.

Example 3

A method of Example 1, wherein a non-conformity is an area of an active layer with characteristics that are capable of being measured and/or where such measurements fall outside a defined range and/or threshold.

Example 4

A method of Example 1 further comprising generating a visualization of the gathered fabrication metrology data of the semiconductor wafer.

Example 5

A method of Example 4, wherein the generating of the visualization includes producing an image of the wafer with particular colors and/or shading that corresponds to particular locations of the wafer are associated with measured and/or calculated range of fabrication metrology data.

Example 6

A method of Example 4, wherein the generating of the visualization includes producing an image of the wafer with particular colors and/or shading that corresponds to particular locations of the wafer are associated with the non-conforming region.

Example 7

A method of Example 1, wherein functionality of the microelectronic devices includes one of the following:
- physical properties, arrangement/orientation relative to its neighboring devices (e.g., within same layer, layers below, and layers above), and physical functionality;
- electrical properties, electrical interactions relative to its neighboring devices (e.g., within same layer, layers below, and layers above), and electrical functionality;
- electrical-magnetic properties, electrical-magnetic interactions relative to its neighboring devices (e.g., within same layer, layers below, and layers above), and electrical-magnetic functionality;
- electrical-mechanical interactions relative to its neighboring devices (e.g., within same layer, layers below, and layers above), and electrical-mechanical functionality; or
- a combination thereof.

Example 8

A method of Example 1, wherein the determination of the systemic impact includes estimating the electrical-mechanical properties and/or functionality of an actual pattern of one layer with the non-conforming region of the semiconductor wafer.

Example 9

A method of Example 1, wherein the determination of the systemic impact includes modeling electrical-mechanical properties and/or functionality of the microelectronic devices formed by at least one layer with the non-conforming region of the semiconductor wafer.

Example 10

A method of Example 1 further comprising ameliorating the non-conformities in the non-conforming regions changing the forming of a collection of microelectronic devices from layers of a semiconductor wafer.

Example 11

A method of Example 1 further comprising ameliorating the non-conformities in the non-conforming regions that are determined to have a sufficient systemic impact on the electrical-mechanical functionality of the microelectronic device being formed as part of the semiconductor wafer.

Example 12

A method of Example 11, wherein the amelioration includes:
- choosing at least one semiconductor fabrication tool;
- selecting at least one change in the operation of the chosen semiconductor fabrication tool, where the at least one change alters the semiconductor fabrication;
- simulating a fabrication of a semiconductor wafer in accordance with the selected change in the operation of the chosen semiconductor fabrication tool;
- estimating the effect of the electrical-mechanical properties and/or functionality of the microelectronic devices formed by the simulated semiconductor wafer.

Example 13

A method of Example 11, wherein the amelioration includes:
- choosing a combination of multiple semiconductor fabrication tools;
- selecting at least one change in the operation of each of the chosen semiconductor fabrication tools, wherein the changes alter the semiconductor fabrication;
- simulating a fabrication of a semiconductor wafer in accordance with the selected change in the operation of each of the chosen semiconductor fabrication tools;
- estimating the effect of the electrical-mechanical properties and/or functionality of the microelectronic devices formed by the simulated semiconductor wafer.

Example 14

A method of Example 11, wherein the amelioration includes at least one change in the operation of at least one semiconductor fabrication tool, wherein the at least one change alters the semiconductor fabrication.

Example 15

A method of Example 11, wherein the amelioration includes at least one change in the operation of each of the chosen semiconductor fabrication tools, wherein the changes alter the semiconductor fabrication.

Example 16

A method of Example 11, wherein the amelioration includes at least one change in the operation of each of the chosen semiconductor fabrication tools, wherein the changes alter the semiconductor fabrication.

Example 17

A method of Example 11, wherein the amelioration includes:

selecting a pattern of a layer that includes some portion of a microelectronic device formed, at least in part, by the non-conforming region;
altering the selected pattern.

Example 18

A method of Example 11, wherein the amelioration includes:
selecting a pattern of a layer that includes some portion of a microelectronic device formed, at least in part, by the non-conforming region;
obtaining an altered pattern, wherein the altered pattern is an alteration of the selected pattern.

Example 19

A method of Example 11, wherein the amelioration includes:
selecting a pattern of a layer that includes some portion of a microelectronic device formed, at least in part, by the non-conforming region;
altering the selected pattern;
simulating a fabrication of a semiconductor wafer with the altered pattern replacing the selected pattern;
estimating the effect of the electrical-mechanical properties and/or functionality of the microelectronic devices formed by the simulated semiconductor wafer.

Example 20

A method of Examples 1 through 19, wherein the tool or tools of semiconductor fabrication is selected from a group consisting of a deposition tool, a track tool, a photolithography tool, an etch tool, and a cleaning tool.

Example 21

A semiconductor fabrication tool configured to change its operation in response to a method of Examples 1 through 19.

Example 22

A non-transitory computer-readable storage medium comprising instructions that when executed cause a processor of a computing device to perform a method of Examples 1 through 19.

Example 23

A semiconductor wafer fabricated, at least in part, in cooperation with a method of Examples 1 through 19.

Example 24

A microelectronic device formed by semiconductor fabrication performed, at least in part, in cooperation with a method of Examples 1 through 19.

Example 25

A non-transitory computer-readable storage medium comprising instructions that when executed cause a processor of a computing device to perform operations in coordination with semiconductor fabrication by forming a collection of microelectronic devices from layers (e.g., a stack of patterns of materials) of a semiconductor wafer, the operations comprising:
gathering fabrication metrology data of the semiconductor wafer, wherein the fabrication metrology data is a measurement of a characteristic of the wafer formed in the semiconductor fabrication;
detecting non-conformities of the semiconductor wafer based on the gathered fabrication metrology data;
identifying a non-conforming region of the semiconductor wafer, wherein the non-conforming region includes an aggregation of neighboring non-conformities;
determining the systemic impact on the non-conformities in the non-conforming regions on the functionality of the microelectronic devices formed at least in part by the non-conforming region.

Example 26

A non-transitory computer-readable storage medium of Example 25, wherein the gathering operation includes:
measurements from multiple semiconductor wafers using a common stack of patterns of materials as the layers of the semiconductors being fabricated;
measuring and/or calculating fabrication metrology data selected from a group consisting of measuring and/or calculating fabrication metrology data selected from a group consisting of edge placement error (EPE), grid critical dimension (CD) measurements, block line width roughness (LWR) measurements, grid LWR measurements, block CD measurements, profile (i.e., cross-section), selective deposition; electrical properties of the formed microelectronic devices; contact hole CD; contact hole roughness (CER and ellipticity; short trenches tip-to-tip distance; line tip-to-tip distance; layer-to-layer displacement data (i.e., overlay data); film thicknesses and uniformities; measurements that occur after actions of a single tool; measurements that occur after all of the tools of a single layer; measurements that occur after multiple layers; and a combination thereof.

Example 27

A non-transitory computer-readable storage medium of Example 25, wherein a non-conformity is an area of an active layer with characteristics that are capable of being measured and/or where such measurements fall outside a defined range and/or threshold.

Example 28

A non-transitory computer-readable storage medium of Example 25 further comprising generating a visualization of the gathered fabrication metrology data of the semiconductor wafer.

Example 29

A non-transitory computer-readable storage medium of Example 28, wherein the generating operation includes producing an image of the wafer with particular colors and/or shading that corresponds to particular locations of the wafer are associated with measured and/or calculated the range of fabrication metrology data.

Example 30

A non-transitory computer-readable storage medium of Example 28, wherein the generating operation includes producing an image of the wafer with particular colors and/or shading that corresponds to particular locations of the wafer are associated with the non-conforming region.

Example 31

A non-transitory computer-readable storage medium of Example 25, wherein functionality of the microelectronic devices includes one of the following:
physical properties, arrangement/orientation relative to its neighboring devices (e.g., within same layer, layers below, and layers above), and physical functionality;
electrical properties, electrical interactions relative to its neighboring devices (e.g., within same layer, layers below, and layers above), and electrical functionality;
electrical-magnetic properties, electrical-magnetic interactions relative to its neighboring devices (e.g., within same layer, layers below, and layers above), and electrical-magnetic functionality;
electrical-mechanical interactions relative to its neighboring devices (e.g., within same layer, layers below, and layers above), and electrical-mechanical functionality; or
a combination thereof.

Example 32

A non-transitory computer-readable storage medium of Example 25, wherein the determination operation includes estimating the electrical-mechanical properties and/or functionality of an actual pattern of one layer with the non-conforming region of the semiconductor wafer.

Example 33

A non-transitory computer-readable storage medium of Example 25, wherein the determination operation includes modeling electrical-mechanical properties and/or functionality of the microelectronic devices formed by at least one layer with the non-conforming region of the semiconductor wafer.

Example 34

A non-transitory computer-readable storage medium of Example 25 further comprising an operation of ameliorating of the non-conformities in the non-conforming regions changing the forming of a collection of microelectronic devices from layers of a semiconductor wafer.

Example 35

A non-transitory computer-readable storage medium of Example 25 further comprising an operation of ameliorating the non-conformities in the non-conforming regions that are determined to have a sufficient systemic impact on the electrical-mechanical functionality of the microelectronic device being formed as part of the semiconductor wafer.

Example 36

A non-transitory computer-readable storage medium of Example 35, wherein the amelioration operation includes:
choosing at least one semiconductor fabrication tool;
selecting at least one change in the operation of the chosen semiconductor fabrication tool, where the at least one change alters the semiconductor fabrication;
simulating a fabrication of a semiconductor wafer in accordance with the selected change in the operation of the chosen semiconductor fabrication tool;
estimating the effect of the electrical-mechanical properties and/or functionality of the microelectronic devices formed by the simulated semiconductor wafer.

Example 37

A non-transitory computer-readable storage medium of Example 35, wherein the amelioration operation includes:
choosing a combination of multiple semiconductor fabrication tools;
selecting at least one change in the operation of each of the chosen semiconductor fabrication tools, wherein the changes alter the semiconductor fabrication;
simulating a fabrication of a semiconductor wafer in accordance with the selected change in the operation of each of the chosen semiconductor fabrication tools;
estimating the effect of the electrical-mechanical properties and/or functionality of the microelectronic devices formed by the simulated semiconductor wafer.

Example 38

A non-transitory computer-readable storage medium of Example 35, wherein the amelioration operation includes at least one change in the operation of at least one semiconductor fabrication tool, wherein the at least one change alters the semiconductor fabrication.

Example 39

A non-transitory computer-readable storage medium of Example 35, wherein the amelioration operation includes at least one change in the operation of each of the chosen semiconductor fabrication tools, wherein the changes alter the semiconductor fabrication.

Example 40

A non-transitory computer-readable storage medium of Example 35, wherein the amelioration operation includes:
selecting a pattern of a layer that includes some portion of a microelectronic device formed, at least in part, by the non-conforming region;
altering the selected pattern.

Example 41

A non-transitory computer-readable storage medium of Example 35, wherein the amelioration operation includes:
selecting a pattern of a layer that includes some portion of a microelectronic device formed, at least in part, by the non-conforming region;
obtaining an altered pattern, wherein the altered pattern is an alteration of the selected pattern.

Example 42

A non-transitory computer-readable storage medium of Example 35, wherein the amelioration operation includes:
selecting a pattern of a layer that includes some portion of a microelectronic device formed, at least in part, by the non-conforming region;
altering the selected pattern;

simulating a fabrication of a semiconductor wafer with the altered pattern replacing the selected pattern;

estimating the effect of the electrical-mechanical properties and/or functionality of the microelectronic devices formed by the simulated semiconductor wafer.

Example 43

A non-transitory computer-readable storage medium of Examples 25 through 42, wherein the tool or tools of semiconductor fabrication is selected from a group consisting of a deposition tool, a track tool, a photolithography tool, an etch tool, and a cleaning tool.

Example 44

A semiconductor fabrication tool configured to change its operation in response the operations of Examples 25 through 42.

Example 45

A semiconductor wafer fabricated, at least in part, in cooperation with the operations of Examples 25 through 42.

Example 46

A microelectronic device formed by semiconductor fabrication performed, at least in part, in cooperation with the operations of Examples 25 through 42.

What is claimed is:

1. A method that facilitates yield of functional microelectronic devices in coordination with semiconductor fabrication, wherein semiconductor fabrication includes forming a collection of microelectronic devices from layers of a semiconductor wafer, the method comprising:

gathering fabrication metrology data of the semiconductor wafer, wherein the fabrication metrology data includes measurements of one or more characteristics of the wafer formed in the semiconductor fabrication and each measurement being associated with a spatial location of the wafer from where such measurement is made;

generating a wafer scale model of the semiconductor wafer based on the gathered fabrication metrology data of the semiconductor wafer;

based on the generated wafer scale model, detecting non-conformities across all of the semiconductor wafer based on the gathered fabrication metrology data;

identifying a non-conforming region of the semiconductor wafer, wherein the non-conforming region includes an aggregation of neighboring non-conformities; and determining the systemic impact on the non-conformities in the non-conforming regions on the functionality of the microelectronic devices formed at least in part in the non-conforming region.

2. The method of claim 1, wherein the gathering of fabrication metrology data includes:

measurements from multiple semiconductor wafers using a common stack of patterns of materials as the layers of the semiconductors being fabricated;

measuring and/or calculating fabrication metrology data selected from a group consisting of edge placement error (EPE); grid critical dimension (CD) measurements; block line width roughness (LWR) measurements; grid LWR measurements; block CD measurements; profile; cross-section; selective deposition; electrical properties of the formed microelectronic devices; contact hole CD; contact hole roughness; CER and ellipticity; short trenches tip-to-tip distance; line tip-to-tip distance; layer-to-layer displacement data; overlay data; film thicknesses and uniformities; measurements that occur after actions of a single tool; measurements that occur after all of the tools of a single layer; measurements that occur after multiple layers; and a combination thereof.

3. The method of claim 1, wherein a non-conformity is an area of an active layer with characteristics that are capable of being measured and/or where such measurements fall outside a defined range and/or threshold.

4. The method of claim 1 further comprising forming a visualization of the gathered fabrication metrology data of the semiconductor wafer.

5. The method of claim 4, wherein the formation of the visualization includes producing an image of the wafer with particular colors and/or shading that corresponds to particular locations of the wafer associated with measured and/or calculated range of fabrication metrology data.

6. The method of claim 4, wherein the formation of the visualization includes producing an image of the wafer with particular colors and/or shading that corresponds to particular locations of the wafer associated with the non-conforming region.

7. A non-transitory computer-readable storage medium comprising instructions that when executed cause a processor of a computing device to perform operations in coordination with semiconductor fabrication by forming a collection of microelectronic devices from layers of a semiconductor wafer, the operations comprising:

gathering fabrication metrology data of the semiconductor wafer, wherein the fabrication metrology data includes measurements of one or more characteristics of the wafer formed in the semiconductor fabrication and each measurement being associated with a spatial location of the wafer from where such measurement is made;

generating a wafer scale model of the semiconductor wafer based on the gathered fabrication metrology data of the semiconductor wafer;

based on the generated wafer scale model, detecting non-conformities across all of the semiconductor wafer based on the gathered fabrication metrology data;

identifying a non-conforming region of the semiconductor wafer, wherein the non-conforming region includes an aggregation of neighboring non-conformities; and determining the systemic impact on the non-conformities in the non-conforming regions on the functionality of the microelectronic devices formed at least in part by the non-conforming region.

8. The non-transitory computer-readable storage medium of claim 7 further comprising forming a visualization of the gathered fabrication metrology data of the semiconductor wafer.

9. The non-transitory computer-readable storage medium of claim 8, wherein the formation of the visualization includes producing an image of the wafer with particular colors and/or shading that corresponds to particular locations of the wafer associated with measured and/or calculated range of fabrication metrology data.

10. The non-transitory computer-readable storage medium of claim 8, wherein the formation of the visualization includes producing an image of the wafer with particular colors and/or shading that corresponds to particular locations of the wafer associated with the non-conforming region.

11. A method comprising:

gathering fabrication metrology data of a semiconductor wafer, wherein the fabrication metrology data includes measurements of one or more characteristics of the wafer formed during fabrication and each measurement being associated with a spatial location of the wafer from where such measurement is made;

generating a model of the semiconductor wafer based on the gathered fabrication metrology data of the semiconductor wafer;

based on the generated model, detecting non-conformities of the semiconductor wafer based on the gathered fabrication metrology data;

forming a fingerprint for the entire semiconductor wafer, the fingerprint being a visualization of the gathered fabrication metrology data of the semiconductor wafer;

identifying a non-conforming region of the semiconductor wafer based on the fingerprint, wherein the non-conforming region includes an aggregation of neighboring non-conformities; and determining the systemic impact on the non-conformities in the non-conforming regions on the functionality of microelectronic devices formed at least in part by the non-conforming region.

12. The method of claim 11, wherein the formation of the fingerprint includes producing an image of the wafer with particular colors and/or shading that corresponds to particular locations of the wafer associated with measured and/or calculated range of fabrication metrology data.

13. The method of claim 11, wherein the formation of the fingerprint includes producing an image of the wafer with particular colors and/or shading that corresponds to particular locations of the wafer associated with the non-conforming region.

14. The method of claim 11, wherein the gathering of fabrication metrology data includes:

measurements from multiple semiconductor wafers using a common stack of patterns of materials as the layers of the semiconductors being fabricated;

measuring and/or calculating fabrication metrology data selected from a group consisting of edge placement error (EPE); grid critical dimension (CD) measurements; block line width roughness (LWR) measurements; grid LWR measurements; block CD measurements; profile; cross-section; selective deposition; electrical properties of the formed microelectronic devices; contact hole CD; contact hole roughness; CER and ellipticity; short trenches tip-to-tip distance; line tip-to-tip distance; layer-to-layer displacement data; overlay data; film thicknesses and uniformities; measurements that occur after actions of a single tool; measurements that occur after all of the tools of a single layer; measurements that occur after multiple layers; and a combination thereof.

15. The method of claim 11, wherein a non-conformity is an area of an active layer with characteristics that are capable of being measured and/or where such measurements fall outside a defined range and/or threshold.

16. The method of claim 11, further comprising:

performing a systemic amelioration of the non-conformities in the non-conforming regions based on determining the systemic impact, the systemic amelioration comprising changing an operation in the semiconductor fabrication performed by a semiconductor tool and simulating a semiconductor wafer to be fabricated with the changed operation to determine whether the changes reduce the non-conformities.

17. The method of claim 1, further comprising:

performing a systemic amelioration of the non-conformities in the non-conforming regions based on determining the systemic impact, the systemic amelioration comprising changing an operation in the semiconductor fabrication performed by a semiconductor tool and simulating a semiconductor wafer to be fabricated with the changed operation to determine whether the changes reduce the non-conformities.

18. The non-transitory computer-readable storage medium of claim 7, the operations further comprising:

performing a systemic amelioration of the non-conformities in the non-conforming regions based on determining the systemic impact, the systemic amelioration comprising changing an operation in the semiconductor fabrication performed by a semiconductor tool and simulating a semiconductor wafer to be fabricated with the changed operation to determine whether the changes reduce the non-conformities.

* * * * *